(12) United States Patent
Tokumoto

(10) Patent No.: US 11,409,485 B2
(45) Date of Patent: Aug. 9, 2022

(54) PRINTING SYSTEM AND CONTROL METHOD THAT MAINTAINS A RESPONSE PERFORMANCE WHEN PROCESSING LOAD INCREASES

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/909,330

(22) Filed: Jun. 23, 2020

(65) Prior Publication Data
US 2020/0409639 A1    Dec. 31, 2020

(30) Foreign Application Priority Data
Jun. 27, 2019    (JP) .............................. JP2019-120038

(51) Int. Cl.
*G06F 3/12*    (2006.01)

(52) U.S. Cl.
CPC .......... *G06F 3/1258* (2013.01); *G06F 3/1205* (2013.01); *G06F 3/1238* (2013.01); *G06F 3/1273* (2013.01); *G06F 3/1274* (2013.01)

(58) Field of Classification Search
None
See application file for complete search history.

(56) References Cited

U.S. PATENT DOCUMENTS

| 2002/0027673 | A1 | 3/2002 | Roosen |
| 2011/0242607 | A1 | 10/2011 | Shenoy |
| 2012/0081731 | A1 | 4/2012 | Suzuki |
| 2014/0218764 | A1* | 8/2014 | Murata ................... H04N 1/00 358/1.15 |
| 2018/0039772 | A1* | 2/2018 | Tokumoto ............ H04N 1/4426 |

FOREIGN PATENT DOCUMENTS

JP    2010-211627 A    9/2010

* cited by examiner

*Primary Examiner* — Thomas D Lee
(74) *Attorney, Agent, or Firm* — Canon U.S.A., Inc., IP Division

(57) ABSTRACT

A first printing apparatus acquires identification information for identifying print data and information indicating a print setting for the print data, when receiving from a user an instruction to print out the print data and an instruction to change the print setting, sends the identification information and information indicating change content of the print setting to a second printing apparatus, and when receiving a print request, prints out print data contained in the received print request. The second printing apparatus changes the print setting based on the information indicating the change content; and sends a print request containing the changed print setting and the print data identified by the identification information. In the first printing apparatus, in response to reception of a print request from the second printing apparatus, print data contained in the received print request is printed out.

8 Claims, 15 Drawing Sheets

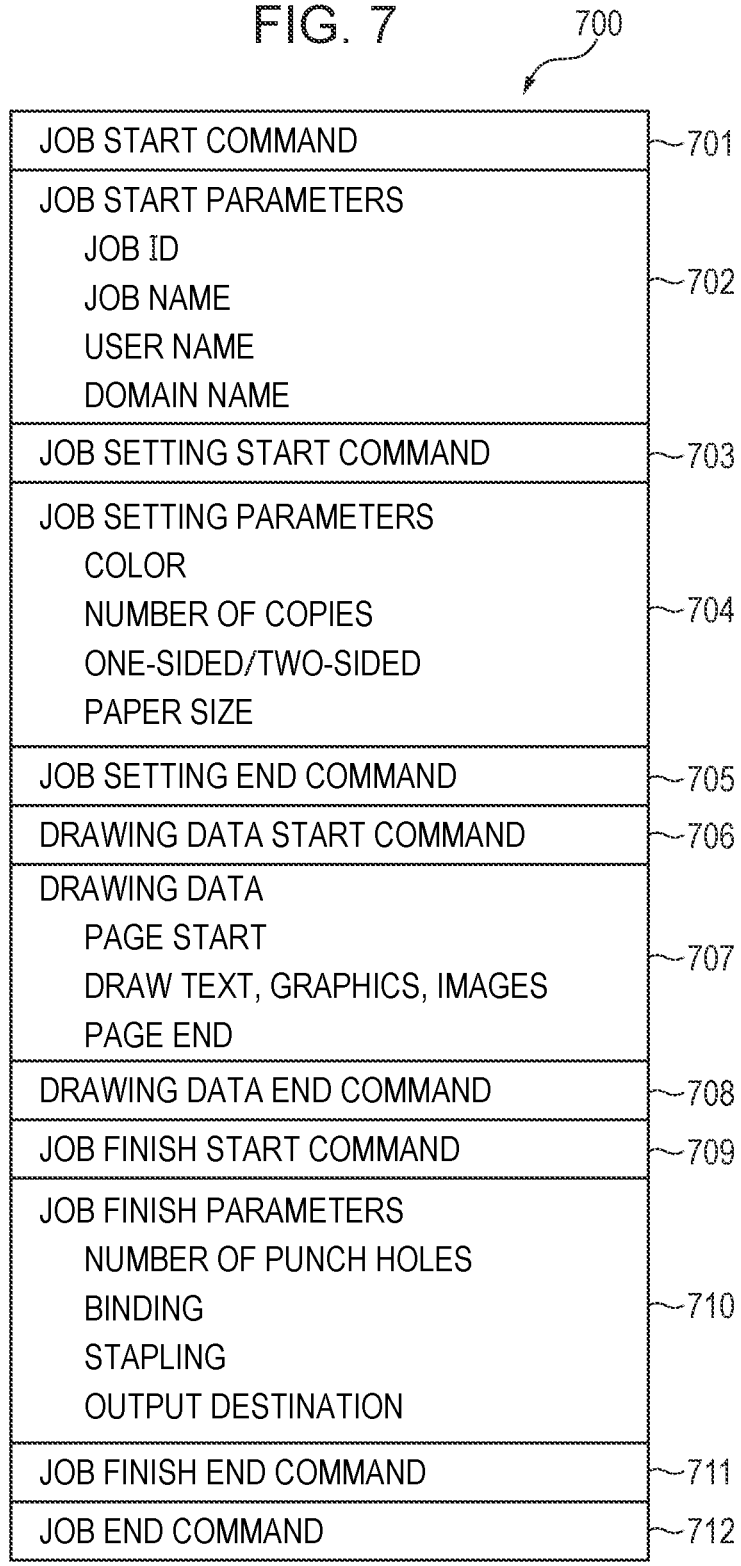

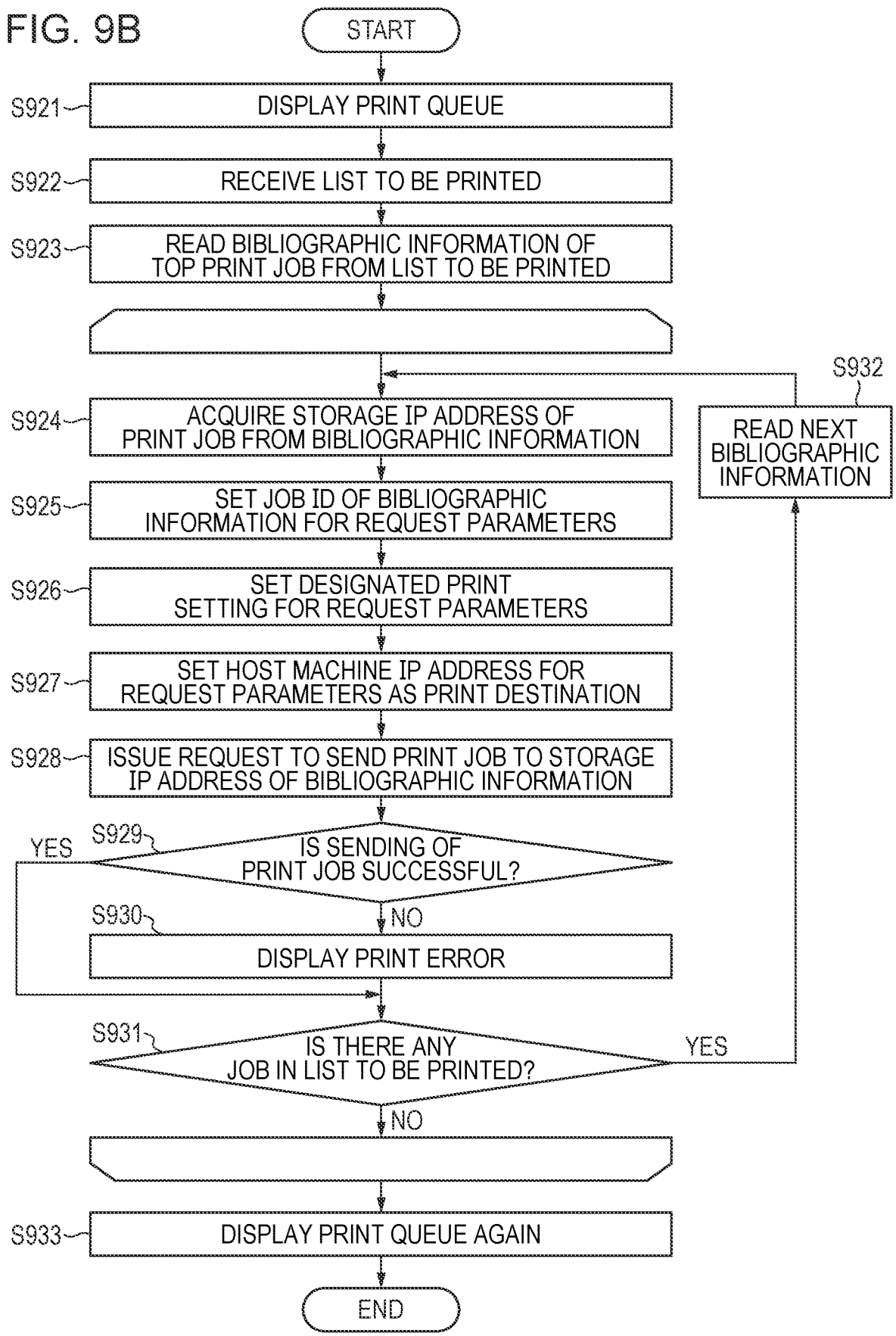

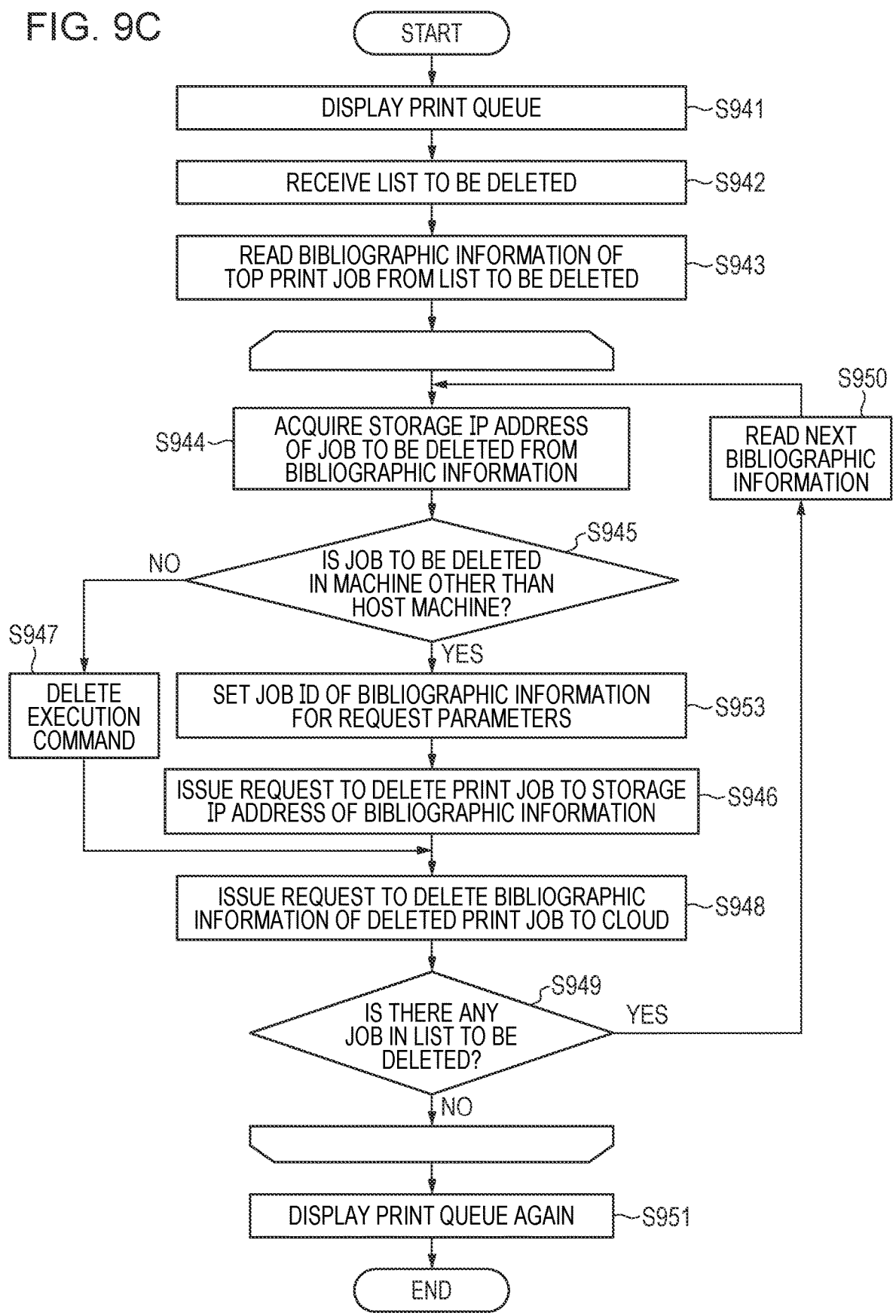

PRINTING SYSTEM AND CONTROL METHOD THAT MAINTAINS A RESPONSE PERFORMANCE WHEN PROCESSING LOAD INCREASES

BACKGROUND OF THE DISCLOSURE

Field of the Disclosure

The present disclosure relates to printing systems and control methods for printing systems.

Description of the Related Art

When existing multifunction peripherals receive print data from terminal devices, such as PCs, the multifunction peripherals print out the print data immediately. In this case, information leakage may occur as a result of third persons seeing printed matter that was forgotten to be picked up or printed matter that was left behind. In recent years, in order to keep confidentiality, reserve printing, in which a multifunction peripheral, upon receiving print data, does not immediately print out the print data but temporarily saves the print data in nonvolatile storage areas of the multifunction peripherals, and then later, when a user provide an instruction to print out the print data on an operating panel of the multifunction peripheral, the multifunction peripheral output the print data, has been proposed.

In addition, in recent years, multifunction peripherals (output machines) that output print data are not limited to multifunction peripherals (input machines) that have received the print data. In other words, multifunction peripherals have been proposed to also perform remote printing that makes it possible to print out print data by acquiring the print data reserved in other multifunction peripherals (See Japanese Patent Laid-Open No. 2010-211627).

In the above-described remote printing, as an output machine receives an instruction to print out print data from a user, information designating the print data is sent to an input machine in which the print data is saved.

Japanese Patent Laid-Open No. 2010-211627 does not assume that a print setting is changed at an output machine. Here, when a user provides an instruction to change a print setting at an output machine and also provides an instruction to print out print data, the output machine saves the print data received from the input machine in the output machine, changes the print setting, and then prints out the print data.

However, the output machine changes a print setting after completion of receiving and saving all the print data and then prints out the print data, so it takes time from when a user provides a print instruction at the output machine to when the output machine actually starts printing.

Moreover, there are several disadvantages when a multifunction peripheral manages bibliographic information.

When a multifunction peripheral manages bibliographic information, since the multifunction peripheral itself has a copy function and/or a scan function, a response performance of management of bibliographic information may decrease when the multifunction peripheral operates at the same time with the function to manage bibliographic information or when requests for a bibliographic information management function concentrate on the server.

In addition, when a multifunction peripheral is used as a bibliography management server, resources of a permanent storage capacity, such as a hard disk drive, are also limited, so extensibility of an upper limit of manageable bibliographic information is poor.

Furthermore, when a multifunction peripheral is used as a bibliography management server, down time of the bibliography management server can occur because the multifunction peripheral may be turned off.

SUMMARY OF THE DISCLOSURE

An example embodiment of the disclosure provides a printing system including a first printing apparatus; and a second printing apparatus. The first printing apparatus includes one or more first memories; and one or more first processors that execute a set of first instructions to acquire identification information for identifying print data and information indicating a print setting for the print data; when receiving from a user an instruction to print out the print data and an instruction to change the print setting for the print data, send the identification information for identifying the print data and information indicating change content of the print setting to the second printing apparatus; and when receiving a print request, print out print data contained in the received print request, and the second printing apparatus including: one or more second memories; and one or more second processors that execute a set of second instructions to change the print setting for the print data based on the information indicating the change content of the print setting; and send a print request containing the changed print setting and the print data identified by the identification information, wherein in the first printing apparatus, in response to reception of a print request from the second printing apparatus, print data contained in the received print request is printed out.

Further features and aspects of the present disclosure will become apparent from the following description of example embodiments with reference to the attached drawings.

BRIEF DESCRIPTION OF THE DRAWINGS

FIG. 7 is a view that shows an example data configuration of a print job to be saved in an example input machine.

FIG. 9B is a flowchart that shows an example of a procedure in which the output machine prints out a print job.

FIG. 9C is a flowchart that shows an example of a procedure in which the output machine deletes a print job.

DESCRIPTION OF THE EMBODIMENTS

Hereinafter, example embodiments, features and aspects thereof the present disclosure will herein be described with reference to the accompanying drawings.

As a result of the disclosed printing system and control method, a response performance is maintained when processing load increases. Moreover, an extension of an upper limit of manageable bibliographic information is made easy. Furthermore, down time of a bibliography management server is reduced.

[Example Network Configuration of Remote Printing System]

Figure 1:
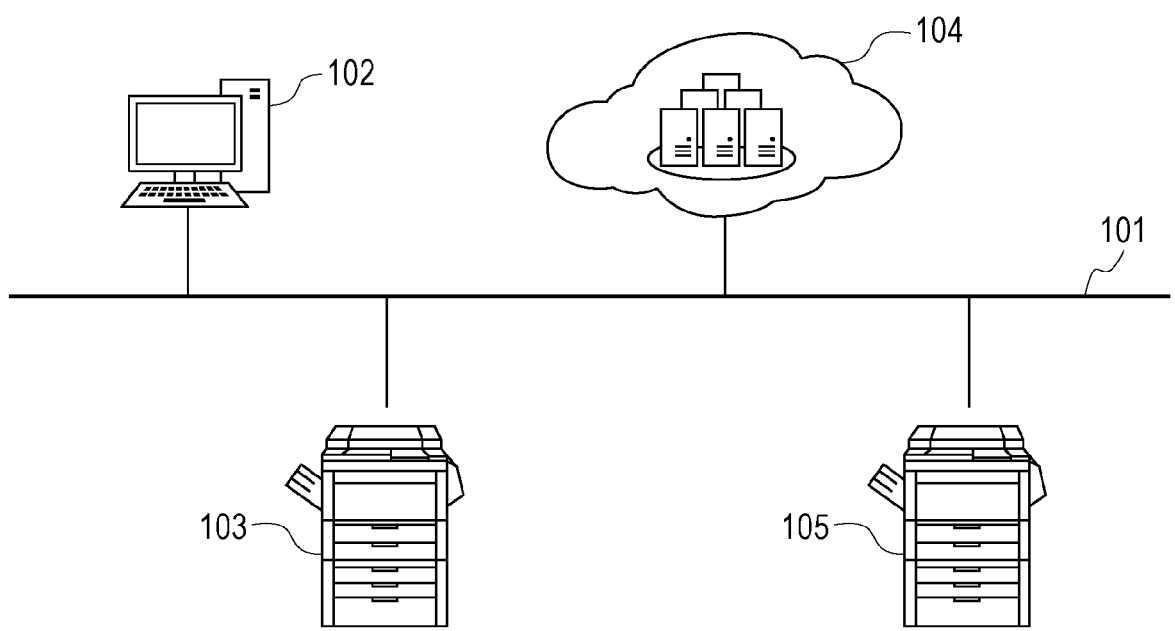
FIG. 1 is a view that shows an example network configuration of an example remote printing system.

FIG. 1 is a view that shows a network configuration to which multifunction peripherals and a cloud server according to the embodiment of the present disclosure are applicable. In FIG. 1, reference numeral 101 represents, for example, a network that supports TCP/IP. A personal computer 102 (PC 102) serving as an information processing apparatus, a cloud server 104, and multifunction peripherals 103, 105 are connected to the network 101.

The multifunction peripheral 103 is an input machine that, upon receiving a print job from the PC 102, stores the print job when a remote printing function is being used. The multifunction peripheral 103 creates bibliographic information from the received print job and sends the bibliographic information to the cloud server 104.

The disadvantages of managing bibliographic information on a multifunction peripheral are eliminated when bibliographic information is managed by a cloud server. Preferably, the cloud server 104 collectively manages pieces of bibliographic information of print jobs stored in all the multifunction peripherals registered on the same network 101. It is also conceivable that the multifunction peripheral 103 or the multifunction peripheral 105 manages bibliographic information.

The multifunction peripheral 105 receives authentication information from a user and authenticates the user. The multifunction peripheral 105 is an output machine that, after user authentication, acquires bibliographic information from the cloud server 104 based on the authentication information, receives a print job from the input machine 103 based on the acquired bibliographic information, and performs printing.

The above-described configuration is a general configuration for the sake of easy illustration. A plurality of the PCs 102, a plurality of the multifunction peripherals 103, and/or a plurality of the multifunction peripherals 105 may be provided. Each of the multifunction peripherals 103, 105 operates as not only an input machine but also an output machine. In other words, each of the multifunction peripherals registered in this system operates as not only an input machine but also an output machine. The respective multifunction peripherals 103, 105 do not need to have a scan function or a copy function and may be a printer 103 or a printer 105 having only a print function.

[Example Schematic Configuration of Each of Multifunction Peripherals]

Figure 2:
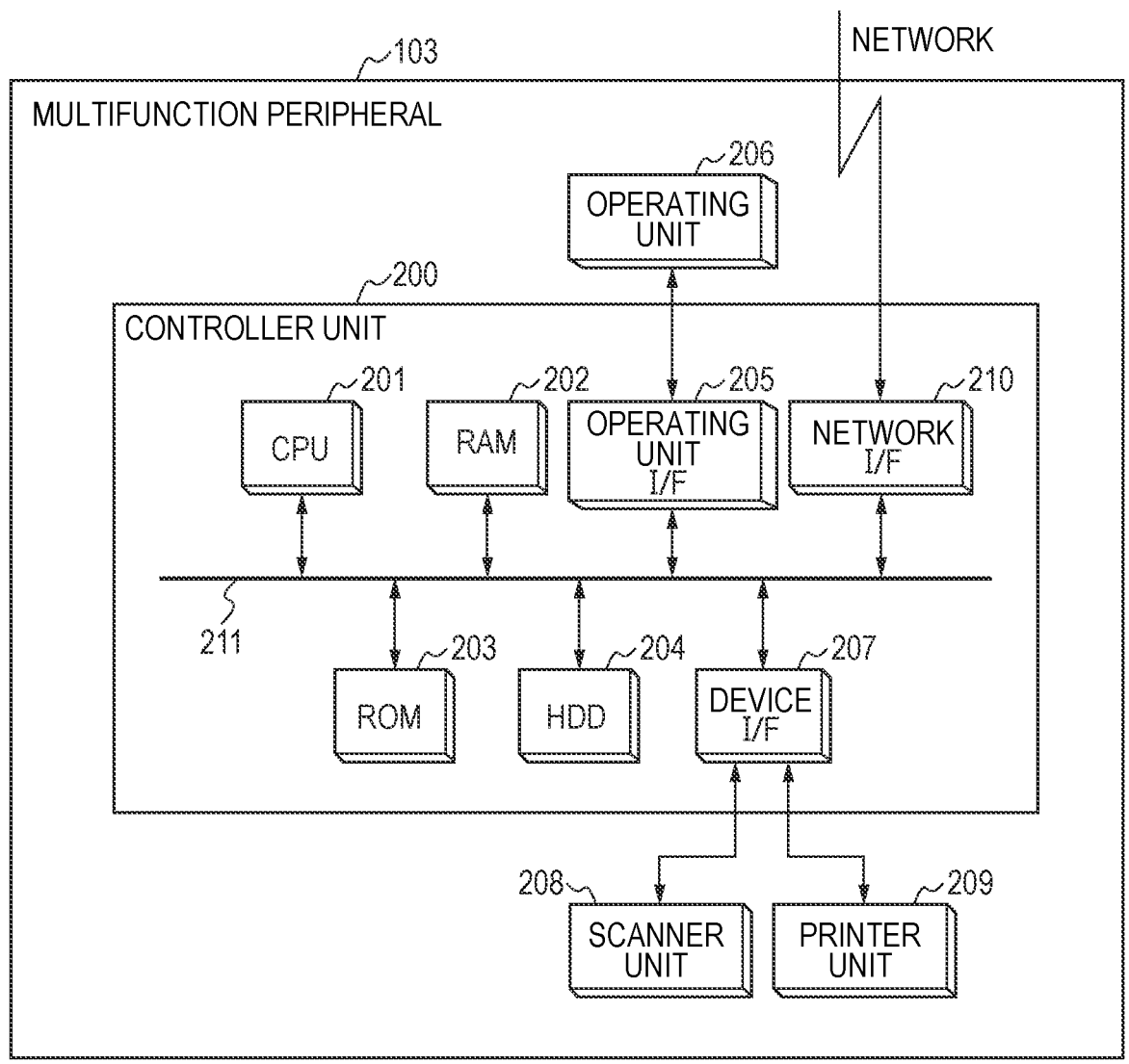
FIG. 2 is a diagram that shows an example hardware configuration of an example multifunction peripheral.

FIG. 2 is a diagram that shows the hardware configuration of each of the multifunction peripherals 103, 105 according to the embodiment of the present disclosure. In FIG. 2, the multifunction peripheral 103 will be described for the sake of simple illustration.

In FIG. 2, the multifunction peripheral 103 includes a controller unit 200, an operating unit 206, a scanner unit 208, and a printer unit 209.

The controller unit 200 is an apparatus that controls the multifunction peripheral or the printer. The controller unit 200 includes a CPU 201, a RAM 202, a ROM 203, an HDD 204, an operating unit I/F 205, a device I/F 207, and a network I/F 210, which are connected by a system bus 211.

The CPU 201 generally controls the devices connected to the system bus 211 and controls the overall image forming apparatus 103. Programs such as an operating system, system software, and application software, and data are stored in the RAM 202. A boot program of the system, a system program, and an application program are stored in the ROM 203. Furthermore, information, such as fonts, that is used in the image forming apparatus 103 may be further stored in the ROM 203. The HDD 204 is a hard disk drive. An operating system, system software, application software, image data, setting data, print jobs, and the like, are stored in the HDD 204. Programs stored in the RAM 202 are executed by the CPU 201 to process image data or data other than images, stored in the RAM 202, the ROM 203, or the HDD 204. A compact multifunction peripheral does not include the HDD 204 and stores system software, application software, and the like, in the ROM 203. Alternatively, instead of the HDD 204 that functions as a storage unit, a storage other than a hard disk drive, like a flash memory, such as a solid state disk (SSD), may be used.

The operating unit I/F 205 is an interface unit with the operating unit 206 having a touch panel. The operating unit I/F 205 outputs image data to be displayed on the operating unit 206 to the operating unit 206. The operating unit I/F 205 sends information input by a user from the operating unit 206 to the CPU 201.

The device I/F 207 connects the scanner unit 208 and the printer unit 209 that are image input/output devices to the controller unit 200 and inputs or outputs image data. Image data input from the scanner unit 208 via the device I/F 207 is stored in the RAM 202 or the HDD 204. Stored image data is, where necessary, subjected to image processing, or the like, with the application program stored in the RAM 202. Image data is output to the printer unit 209 via the device I/F 207. The network I/F 210 connects with a network and inputs or outputs image data from or to an external device on the network or information for controlling the multifunction peripheral.

A configuration not shown in FIG. 2 is also applicable as long as the advantageous effects of the present disclosure are obtained, and a configuration is not limited to the configuration of FIG. 2. For example, in the case of a multifunction peripheral having a facsimile (fax) function, the controller unit 200 may include an I/F (not shown in FIG. 2) intended for a modem and may be able to send a fax by connecting with a public line with the modem. Alternatively, in order to make it possible to read out data stored in, for example, a flash memory card, or the like, and print out the data, the controller unit 200 may include a USB I/F (not shown).

[Example Software Configuration of Each of Multifunction Peripherals]

Figure 3:
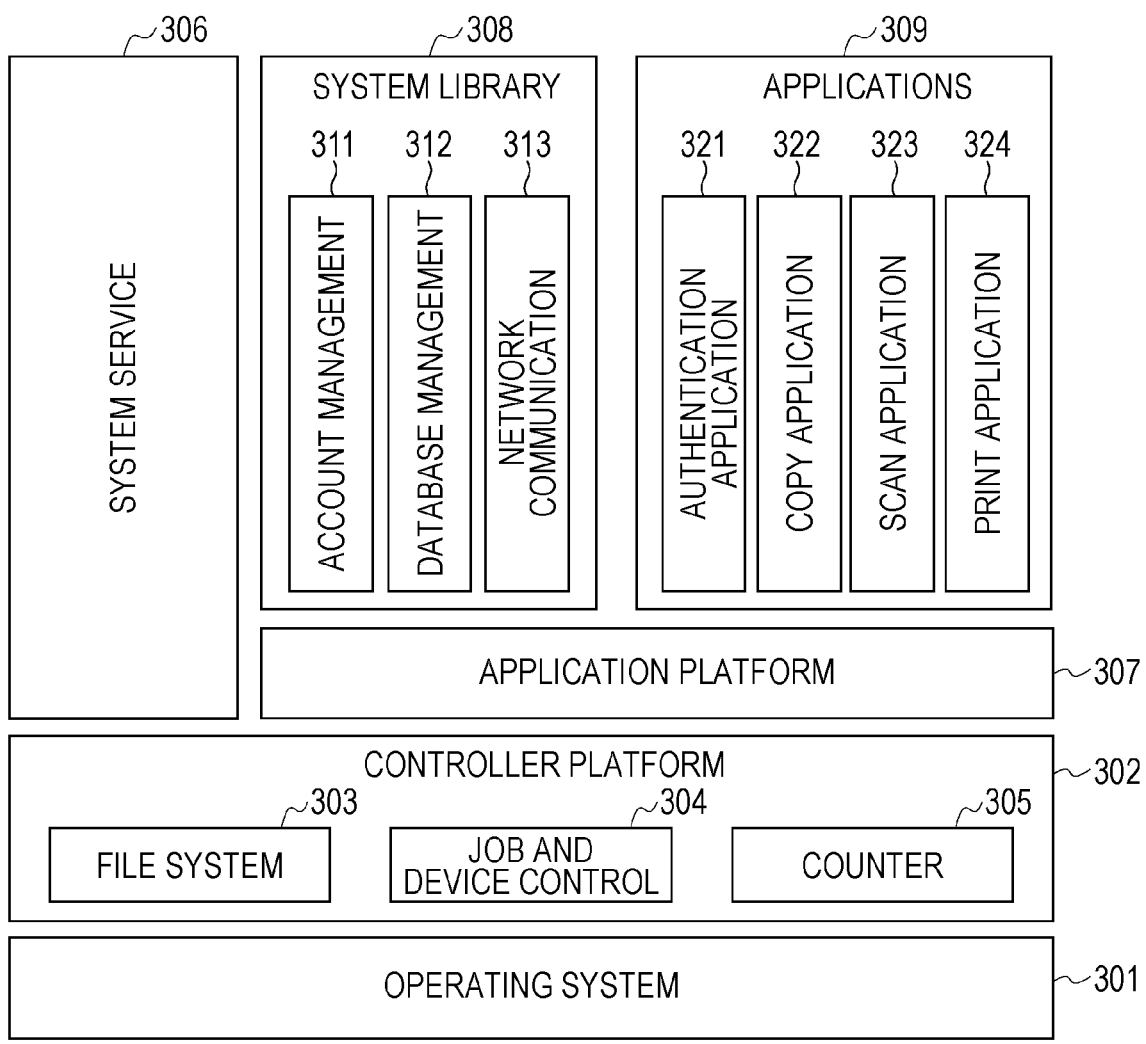
FIG. 3 is a diagram that shows an example software configuration of the multifunction peripheral.

FIG. 3 is a diagram that shows the software configuration of each of the multifunction peripherals 103, 105 according to the embodiment of the present disclosure, which is implemented in the controller unit 200. Software that is incorporated in the multifunction peripheral or printer and processed by the controller unit 200 is implemented as so-called firmware and is executed by the CPU 201.

An operating system 301 provides services and frameworks of various resources management optimized to control an embedded system for software that runs on the operating system 301. The services and frameworks for resources management, which the operating system 301 provides, include multi-task management for substantially operating a plurality of processes in parallel by managing a plurality of running contexts to be processed by the CPU 201, and inter-task communication that realizes synchronization between tasks and data exchange. Furthermore, the operating system 301 provides memory management, interrupt management, various device drivers, a protocol stack that implements processes of various protocols for a local interface, a network, communication, and the like, and other functions.

A controller platform 302 is made up of a file system 303, job and device control 304, and a counter 305. The file system 303 is a mechanism for storing data constructed on a storage such as the HDD 204 and the RAM 202. The file system 303 is used to spool jobs that the controller unit 200 handles or save various data. The job and device control 304 controls the hardware of the multifunction peripheral or printer and mainly controls jobs that use basic functions (print, scan, communication, image conversion, and the like) that the hardware provides. The counter 305 manages the expiration date of each application and counter values based on usages of print and scan.

A system service 306 is a module for monitoring the operational status of the multifunction peripheral or printer or downloading software or license from a software distribution server via the network.

An application platform 307 is middleware for enabling the mechanisms of the operating system 301 and controller platform 302 to be used from a system library 308 (described later) or applications 309 (described later).

The system library 308 is a software module that provides functions of services available from the applications 309. The system library 308 is made up of account management 311, database management 312, and network communication 313.

The applications 309 are software modules that are able to display a menu on the operating unit 206 and receive input from a user and that provide the user with various functions that are realized by the multifunction peripheral or printer.

An authentication application 321 is one of the applications 309. The authentication application 321 manages users that are allowed to use the multifunction peripheral 103 or the multifunction peripheral 105 by using the account management 311 that is in the system library 308. The account management 311 performs user authentication by communicating with an authentication application 410 of the cloud server 104 (described later) by using the network communication 313. The account management 311 authenticates a user by communicating with the authentication application 410 for verifying a user name and a password input via the operating unit 206.

A copy application 322 is one of the applications 309. The copy application 322 provides a paper document copy function by accessing the job and device control 304 via the application platform 307.

A scan application 323 is one of the applications 309. The scan application 323 provides a function to scan a paper document and create electronic data by accessing the job and device control 304 via the application platform 307.

A print application 324 is one of the applications 309. When the remote printing function is enabled, the print application 324 reserves a received print job, creates bibliographic information from the print job, and sends a registration request to the cloud server 104.

The print application 324 communicates with the cloud server 104 by using the network communication 313 and displays a print queue or changes a setting for a print job or deletes a print job from the acquired bibliographic information.

The print application 324 connects with another multifunction peripheral 103 or another multifunction peripheral 105 by using the network communication 313 and provides the remote printing function to hold an acquired print job in the HDD 204 and run the print job.

The print application 324 provides a function to execute output in accordance with a print job held in the HDD 204 by accessing the job and device control 304 via the application platform 307.

[Example Software Configuration of Cloud Server]

Figure 4:
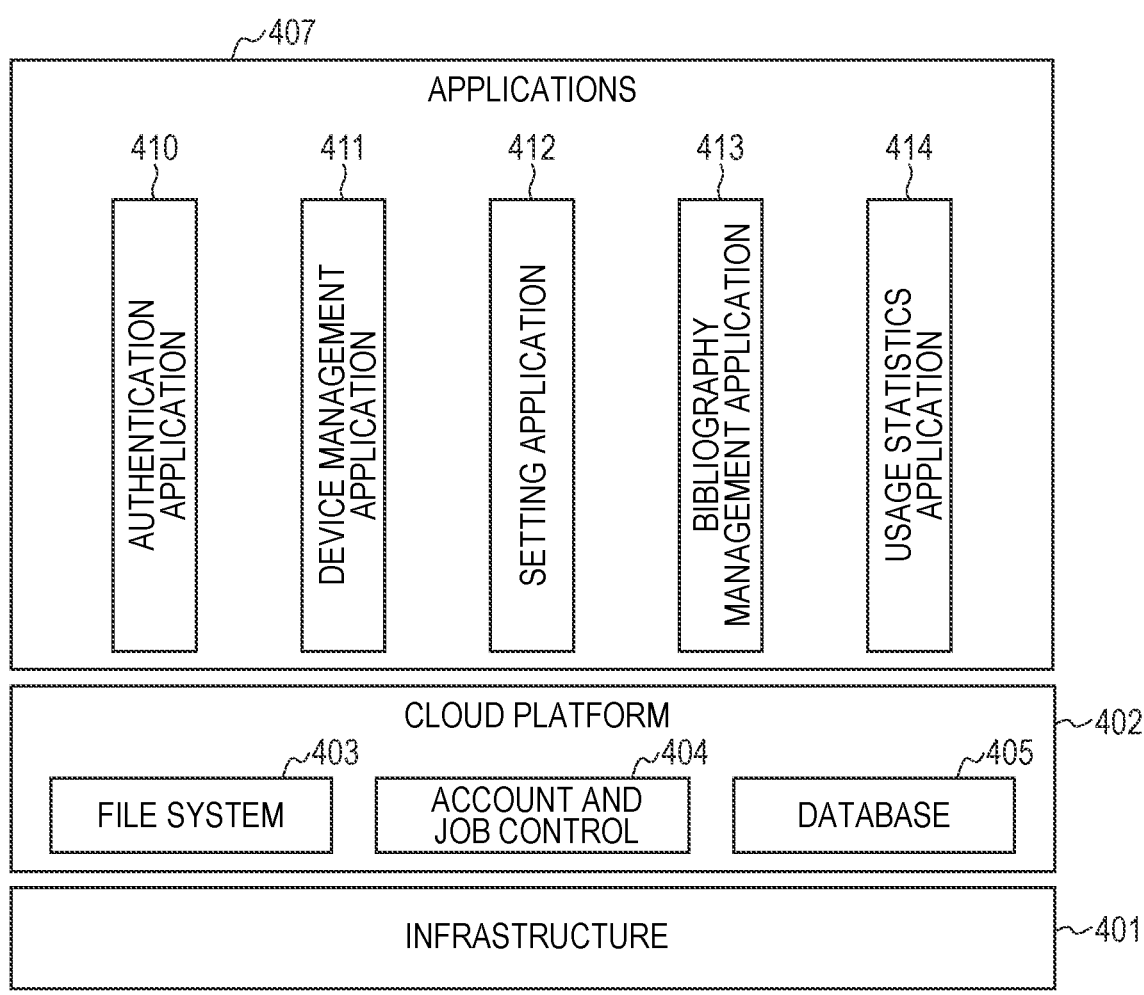
FIG. 4 is a diagram that shows an example software configuration of a cloud server.

FIG. 4 is a diagram that shows the software configuration of the cloud server 104 according to the embodiment of the present disclosure, which is implemented in the cloud server 104.

An infrastructure 401 is a base for a cloud server to provide services and is made up of a server, a virtual machine, a storage, a network, and an operating system.

A cloud platform 402 is a framework that provides common basic functions to applications 407 by using the infrastructure 401 and is made up of a file system 403, account and job control 404, and a database 405.

The applications 407 are able to communicate with a web browser that operates on the PC 102 and display a menu on a web browser page on the PC 102 or receive input from a user. The applications 407 are software modules that manage user accounts that are allowed to use the multifunction peripherals or printers, visualize usage statistics of the multifunction peripherals or printers, and provide users with various functions that use the multifunction peripherals or printers.

An authentication application 410 is one of the applications 407. The authentication application 410 manages users that are allowed to use the multifunction peripherals 103, 105 by using the account and job control 404 in the cloud platform 402. The authentication application 410 receives user information on which an authentication request is sent from the authentication application 321 of any one of the multifunction peripherals 103, 105 via the network and verifies a user name and a password. The authentication application 410 may use an external authentication server, such as Active Directory and LDAP, for user authentication without using the account and job control 404 in the cloud platform 402.

A device management application 411 is one of the applications 407. The device management application 411 performs device management, such as registration, edition, and deletion, of the multifunction peripherals 103, 105 that are targets to be connected.

A setting application 412 is one of the applications 407. The setting application 412 sets functions to be provided to a user on the cloud server 104.

A bibliography management application 413 is one of the applications 407. The bibliography management application 413 manages bibliographic information that is printable by the multifunction peripherals 103, 105 registered in the device management application 411 for each of users registered in the authentication application 410. Bibliographic information is management information of a print job input to a multifunction peripheral, such as a job ID of a print job, a date and time of receipt, an IP address and directory path of a multifunction peripheral in which a print job is stored, a job name, and a print setting.

A usage statistics application 414 is one of the applications 407. The usage statistics application 414 displays statistics information of usages of functions such as print and scan. A method of displaying statistics information is to display statistics information on the web browser page of the PC 102 for each of the multifunction peripherals 103, 105 registered in the device management application 411 or for each of users registered in the authentication application 410.

[Example Top Menu Screen of Multifunction Peripheral]

Figure 5A:
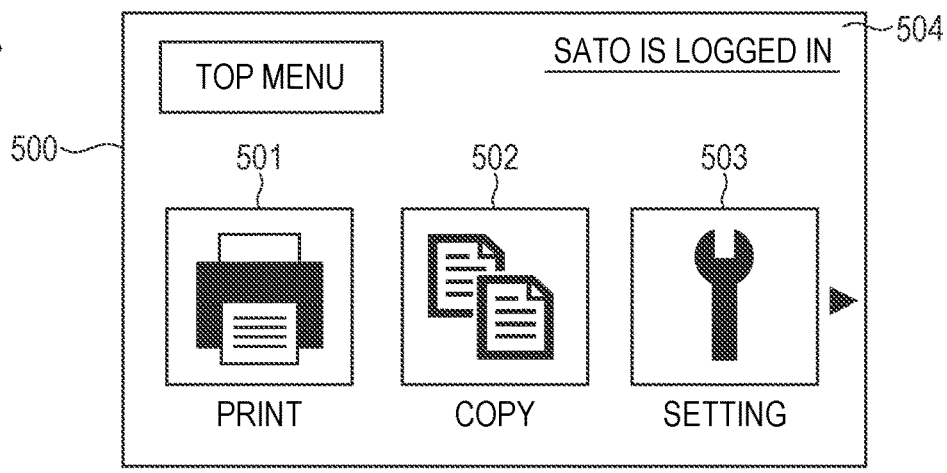
FIG. 5A to FIG. 5C are examples of screens that a print application of the multifunction peripheral displays on an example operating unit.

FIG. 5A is an example of a top menu screen in the multifunction peripheral 105 that is an output machine according to the embodiment. This screen is displayed on the operating unit 206 of the multifunction peripheral 105.

When a user logs into the multifunction peripheral 105 with an IC card, or the like, a top menu 500 is displayed after the login, and the user is able to select an application to be used in the multifunction peripheral 105 from the top menu 500. Since the user is logged in the multifunction peripheral 105, a login user name 504 is displayed on the screen. An example of the screen on which the user name "Sato" is displayed during the login is shown.

The icons of the applications 309 installed in the multifunction peripheral 105 are displayed on the top menu 500. A print icon 501 is the icon of the print application 324. When the print icon 501 is depressed, the print application 324 is launched.

A copy icon 502 is the icon of the copy application 322. When the copy icon 502 is depressed, the copy application 322 is launched. A setting icon 503 is the icon of an application that is one of the applications 309 to set up the multifunction peripheral 105.

[Description of Example Print Queue Display Screen]

Figure 5B:
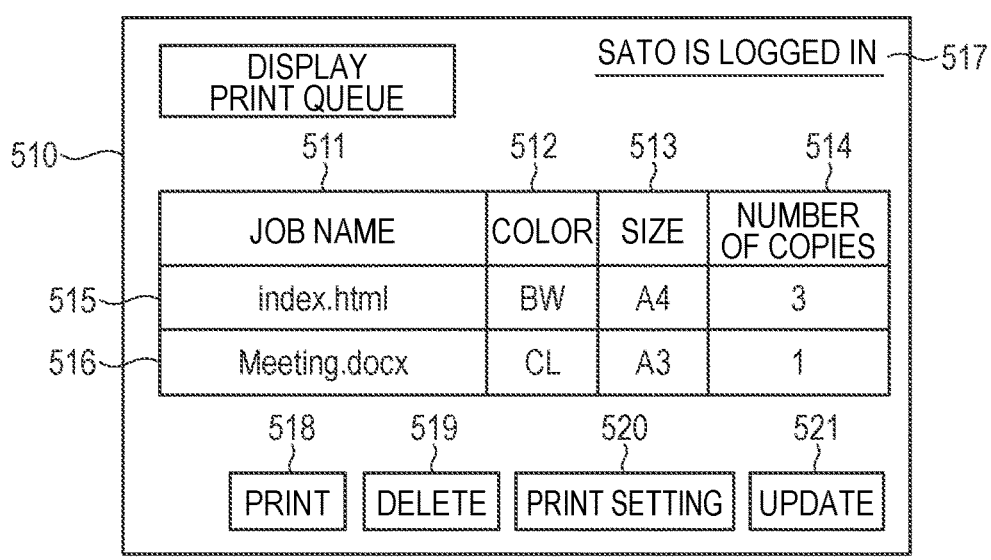

FIG. 5B is an example of a print queue display screen in the multifunction peripheral 105 that is an output machine according to the embodiment. This screen is displayed on the operating unit 206 by the print application 324 that is executed by the CPU 201 of the multifunction peripheral 105. On the print queue display screen, a list of print jobs that an authenticated user holds is displayed.

FIG. 5B is the print queue display screen 510 of the print application 324, which is displayed by depressing the print icon 501. An example of the screen on which the user name "Sato" is displayed during the login is shown. On the print queue display screen 510, a list of print data associated with the login user is displayed. For each print job, a job name 511, a color/monochrome setting 512, a paper size 513, and the number of copies 514 are shown. Two print jobs 515, 516 are operational on this screen. The print application 324 acquires the bibliographic information of "Sato" that is the login user from the cloud server 104 that manages bibliographic information and displays the bibliographic information on the print queue display screen 510. For these print jobs, reference numeral 518 represents a print button, reference numeral 519 represents a delete button, reference numeral 520 represents a print setting button, the user selects a desired print job from among the print jobs displayed and depresses any one of these buttons. Thus, the user makes an operation on the intended print job. Reference numeral 517 indicates the login user. Reference numeral 521 represents an update button. When the update button is depressed, the print application 324 of the multifunction peripheral 105 acquires the bibliographic information of "Sato" that is the login user from the cloud server 104 again and updates a list of print jobs based on the acquired bibliographic information.

[Description of Example Setting Change Screen]

Figure 5C:
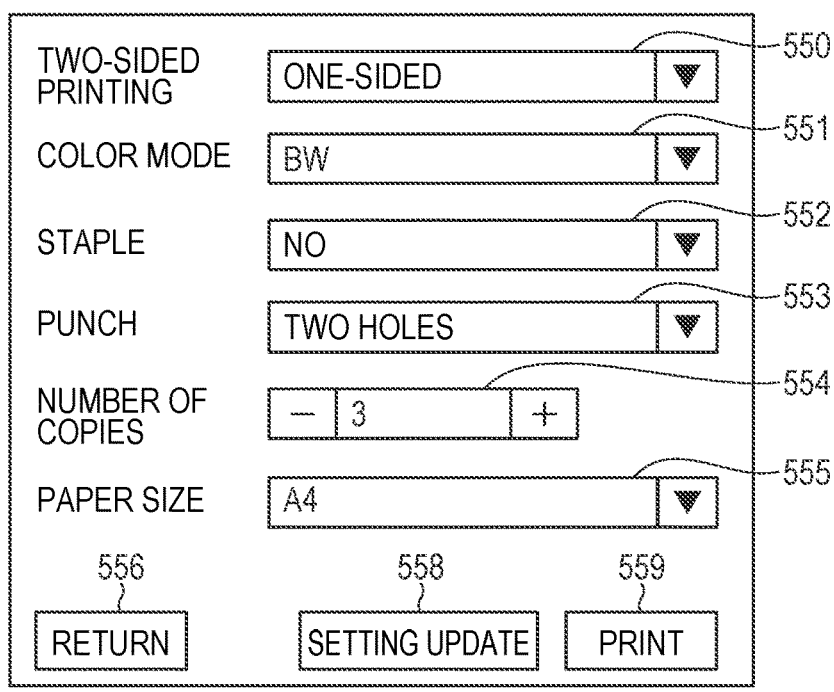

FIG. 5C is a print setting screen to be displayed when the print setting button 520 is depressed. For a print job selected on the print queue display screen 510, an operation to change a print setting, update the print setting, and print in accordance with the print job is possible. Currently set values are displayed for a two-sided printing setting 550, a color mode setting 551, a staple setting 552, a punch setting 553, a number of copies setting 554, and a paper size setting 555. The user is able to select a setting of print setting that the user desires to change from among these settings and change the set values. Reference numeral 556 represents a return button. When a print setting is changed and the return button is depressed, the changed print setting is cancelled. Reference numeral 558 represents a setting update button. When the user changes set values and then depresses this button, the print application 324 updates bibliographic information with the changed print setting and issues a request to update the bibliographic information to the cloud server 104. Reference numeral 559 represents a print button. When the user changes set values and then depresses this button, the print application 324 runs an intended print job in accordance with the changed print setting. After that, the print application 324 updates the bibliographic information with the changed print setting and issues a request to update bibliographic information to the cloud server 104.

[Description of Example Device Management Screen of Cloud Server]

Figure 6A:
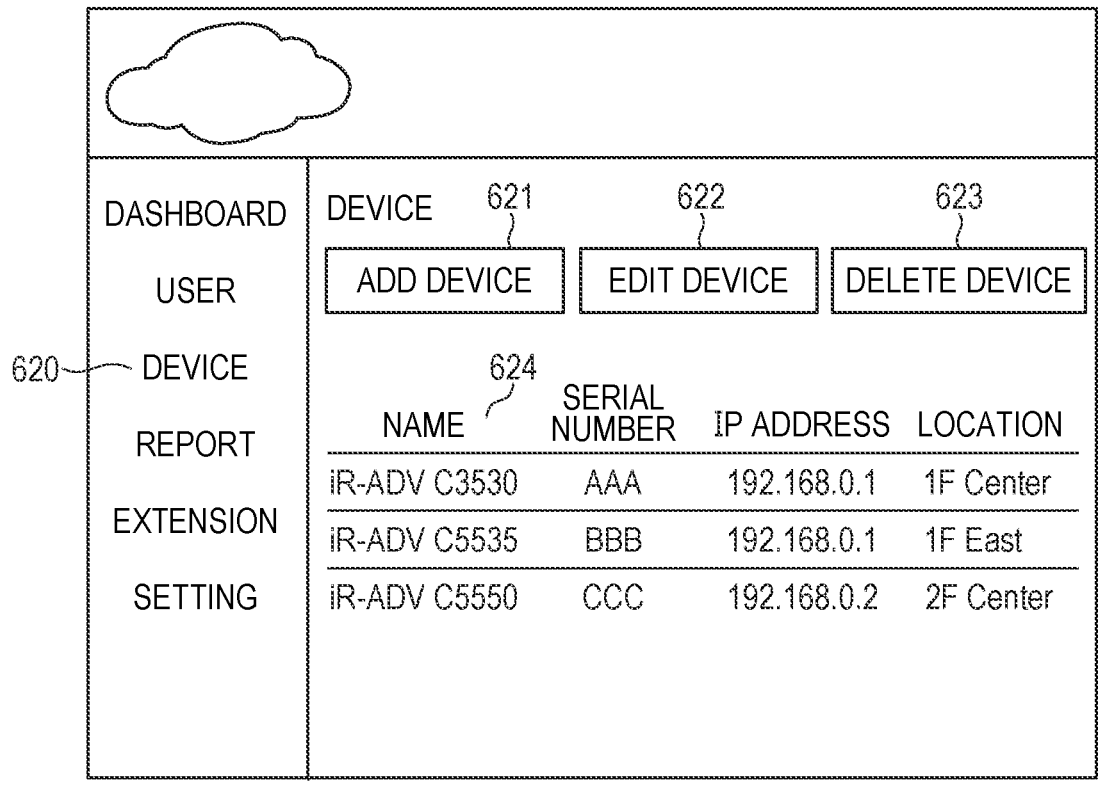
FIG. 6A and FIG. 6B are examples of screens that a setting application of the cloud server displays on an example browser.
Figure 6B:
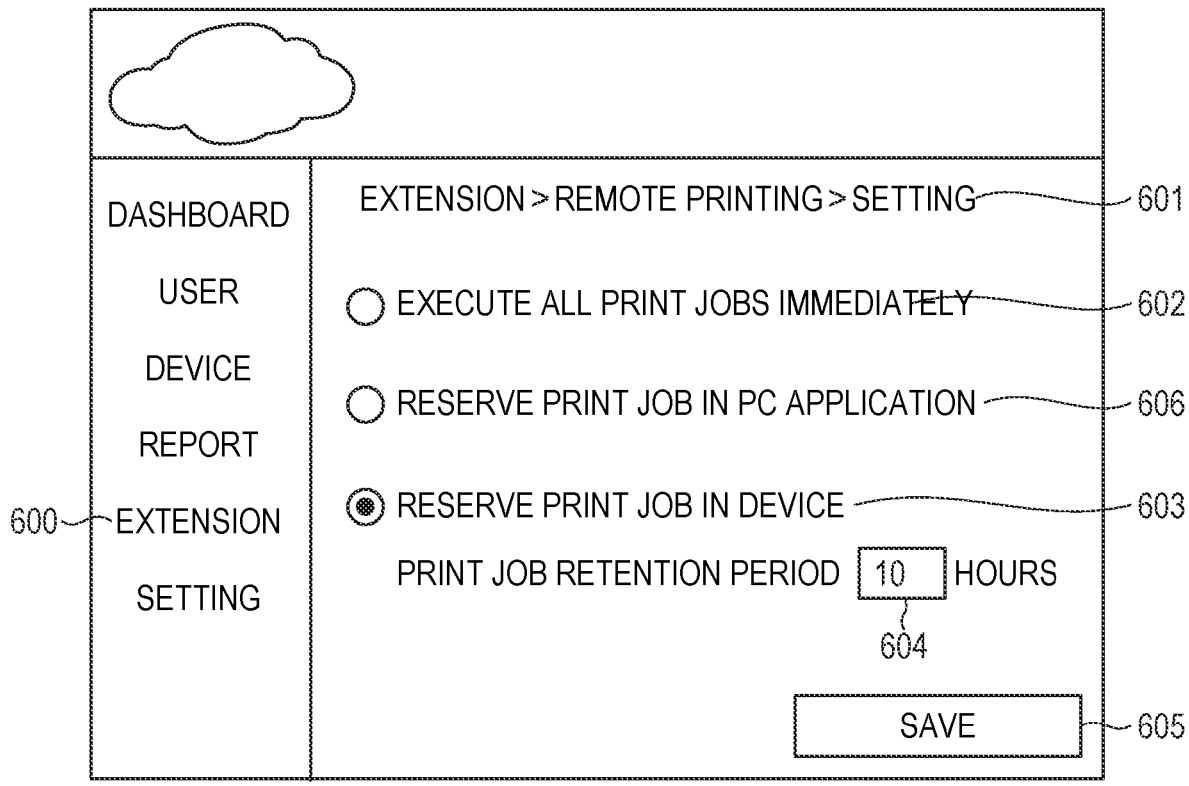

FIG. 6A and FIG. 6B are examples of various functions and setting screens that are provided by the cloud server 104 according to the embodiment. These screens are generated by the applications 407 of the cloud server 104, and the functions are provided. A web browser that operates on the PC 102 communicates with the cloud server 104, and these screens are displayed on the web browser of the PC 102.

FIG. 6A is a device management display screen of the device management application 411, which is displayed by clicking on a device tab 620. A list of multifunction peripherals and printers for which the cloud server 104 provides the functions of the cloud server 104 is displayed in 624. Reference numeral 621 represents a device add button, reference numeral 622 represents a device edit button, and reference numeral 623 represents a device delete button. When a multifunction peripheral or printer for which the cloud server 104 provides functions is added or deleted, a user depresses the device add button 621 or the device delete button 623. When a user wishes edit information (IP address or location) of a registered device, the user depresses the device edit button 622. The cloud server 104 provides the registered devices with functions such as authentication of allowable users, statistics and visualization of usages of print and scan at each device, and remote printing.

[Description of Example Extension Screen of Cloud Server]

FIG. 6B is an extension setting screen that is displayed by clicking on an extension tab 600. Selection and setting of remote printing that is one of extensions are possible. The setting application 412 that operates on the cloud server 104 creates a screen for the remote printing setting 601. A user selects one from among the following three as a set value to be applied.

When "EXECUTE ALL PRINT JOBS IMMEDIATELY" 602 is selected, all the devices 624 registered in the device management application 411 immediately perform printing without reserving upon receiving a print job. Therefore, this setting disables usages of remote printing.

When "RESERVE PRINT JOB IN PC APPLICATION" 606 is selected, a print application installed in advance in the PC 102 reserves a print job in an HDD in the information processing apparatus upon receiving the print job. The print application creates bibliographic information of the reserved print job and issues a request to add the bibliographic information to the bibliography management application 413 of the cloud server 104. All the devices on the same network are set such that remote printing is available by acquiring a bibliographic information list from the bibliography management application 413 of the cloud server 104. In the case of this configuration, as listed as the problems, at the time of executing remote printing, an information processing apparatus in which a print job is reserved needs to be in operation.

When "RESERVE PRINT JOB IN DEVICE" 603 is selected, all the devices 624 registered in the device management application 411 each reserve a print job in the HDD 204 in the host machine upon receiving the print job. Each device 624 creates bibliographic information of the reserved print job and issues a request to add the bibliographic information to the bibliography management application 413 of the cloud server 104. Devices other than the devices having received print jobs each are also set such that remote printing is available by acquiring a bibliographic information list from the bibliography management application 413 of the cloud server 104.

When "RESERVE PRINT JOB IN PC APPLICATION" 606 or "RESERVE PRINT JOB IN DEVICE" 603 is selected, a print job retention period 604 can be set. This means that each of the print application on the PC 102 and the print applications 324 on all the registered devices 624, which reserves a print job, saves the print job for a period set in the print job retention period 604 from when the print job is received. When the print job retention period 604 elapses, the print job is deleted. When a save button 605 is clicked, set values for remote printing are saved and setting changes are applied.

[Example Print Job]

FIG. 7 provides an example of the data configuration of a print job that is saved in the multifunction peripheral 103 that is an input machine. The print job that is saved in the HDD 204 in the multifunction peripheral that is an input machine and shows the data structure of a single print job 700. The print job 700 is created by a printer driver that operates on the PC 102.

A job start command 701 is arranged at the top of the print job and means that a job start of this data begins here. Job start parameters 702 include a job ID that is the identifier of the print job, a job name of the print job, a name of a user who holds the print job, and a domain name to which the user who holds the print job belongs. Pieces of information that belong to this print job are arranged in the job start parameters 702.

A job setting start command 703 is arranged at the top of job setting information and means that a job setting start of this data begins here. Job setting parameters 704 indicate a print setting of the print job. Setting information on color setting, designated number of copies, one-sided/two-sided setting, and designated paper size is arranged in the job setting parameters 704.

A job setting end command 705 is arranged at the end of the job setting information and means that a job setting of this data ends here. A drawing data start command 706 is arranged at the top of page description language (PDL) data describing information to be drawn onto printed matter and means that a start of drawing data begins here.

Page description language (PDL) data is arranged in drawing data 707. The drawing data 707 is made up of a page start command, designated objects (text, graphics, and images) to be drawn in a page, and a page end command. Information to be drawn by this print job is arranged in the drawing data 707.

A drawing data end command 708 is arranged at the end of page description language (PDL) data describing information to be drawn onto printed matter and means an end of the drawing data.

A job finish start command 709 is arranged at the top of job finish setting information and means that a job finish setting start of this data begins here. Job finish parameters 710 indicate a finish setting of the print job. Setting information on number of punch holes, binding, stapling, and output designation is arranged in the job finish parameters 710.

A job finish end command 711 is arranged at the end of the job finish setting information and means that a job finish setting of this data ends here. A job end command 712 is arranged at the end of the job and means that the data of this job ends here.

[Example Procedure to Set Up Remote Printing]

Figure 8A:
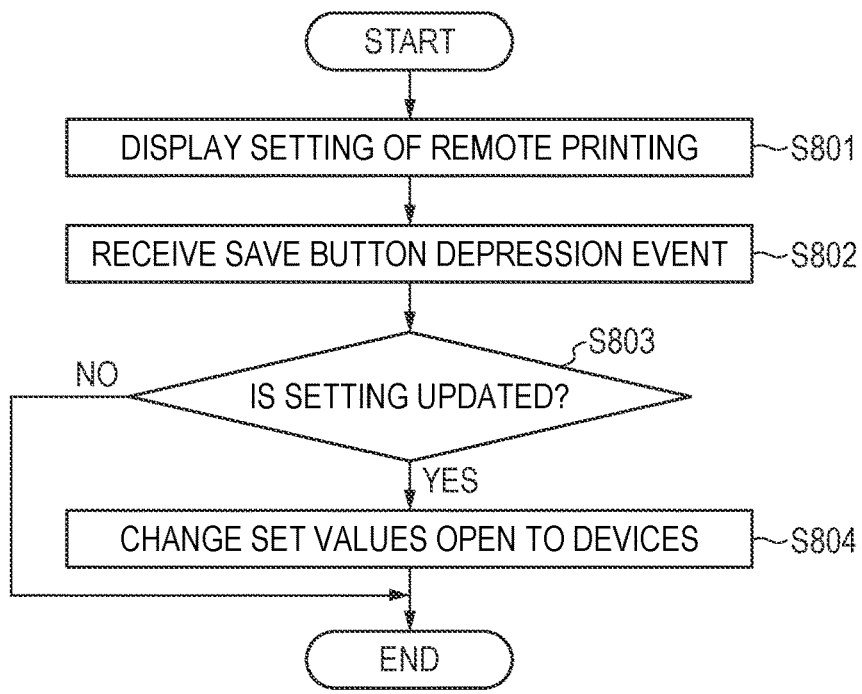
FIG. 8A and FIG. 8B are flowcharts that show examples of a procedure to set the cloud server and a procedure to set the multifunction peripheral.
Figure 8B:
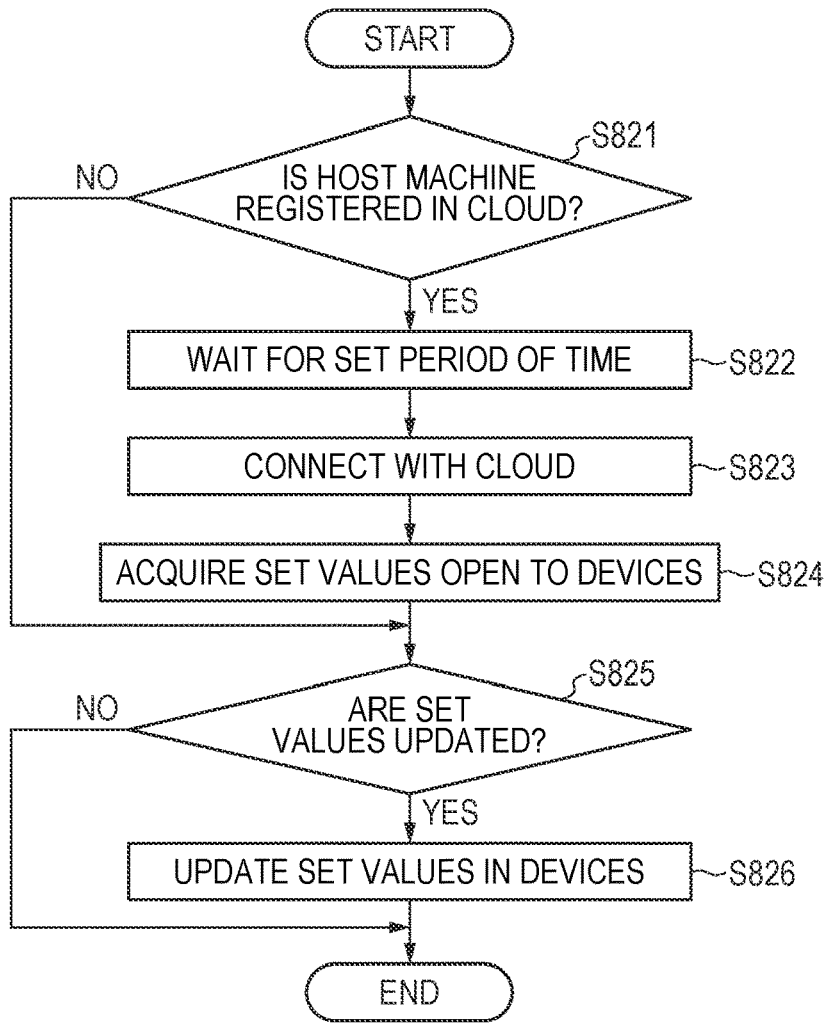

FIG. 8A and FIG. 8B are flowcharts that show examples of a procedure to set up remote printing according to the embodiment of the present disclosure.

FIG. 8A is a flowchart that shows a procedure in which the cloud server 104 sets up remote printing.

The setting application 412 that operates on the cloud server 104 initially displays a setting screen (FIG. 6B) for remote printing on the web browser of the PC 102 in response to user's operation, or the like, in S801. In S802, the setting application 412 receives an event informing that the save button 605 is depressed from the web browser of the PC 102.

In S803, the setting application 412 acquires set values for remote printing, set by the user from the web browser of the PC 102, and determines whether the set values are updated from those when the save button 605 was depressed before. When not updated, a series of steps ends.

Whether "RESERVE PRINT JOB IN DEVICE" 603 is enabled or disabled as a set value for remote printing is checked. When the "RESERVE PRINT JOB IN DEVICE" 603 is enabled, the print job retention period 604 is also used in the acquisition and determination in S803.

When set values for remote printing are updated or at the time of an initial setting in S803, the process proceeds to S804, and the setting application 412 updates set values open to the registered devices and ends a series of steps.

FIG. 8B is a flowchart that shows an example of a procedure in which each of the multifunction peripherals 103, 105 sets up remote printing.

The print application 324 that operates on each of the multifunction peripherals 103, 105 initially checks in S821 whether the host machine is registered in the cloud server 104. When registered, the process proceeds to S822; whereas, when not registered, the process proceeds to S825.

In S822, the print application 324 enters a standby state for a set period of time. After the set period of time such as 15 minutes elapses, the process proceeds to S823. In S823, the print application 324 connects with the cloud server 104 via the network communication 313. In S824, the print application 324 acquires the set values open in S804 by the setting application 412 of the cloud server 104.

In S825, the print application 324 checks whether the set values acquired from the setting application 412 of the cloud server 104 are updated as compared to the set values acquired last time. When not updated from the set values acquired last time, a series of steps ends. When updated from the set values acquired last time, the process proceeds to S826, and each of the multifunction peripherals 103, 105 updates and applies the set values held in the HDD 204 of the host machine, after which a series of steps ends.

[Example Print Job Sending Procedure]

An example of a procedure in which a user sends a print job from the PC 102 to the multifunction peripheral 103 that is an input machine will be described. Hereinafter, it is assumed that the multifunction peripheral 103 is managed for authentication by the authentication application 321.

In the present embodiment, an example in which print set values and page description language (PDL) data are sent to the multifunction peripheral 103 as a print job will be described. PDL includes LIPS, PostScript, and the like. The multifunction peripheral 103 performs printing by interpreting PDL and performing RIP processing. A print job may be, other than PDL data, a format that the multifunction peripheral 103 is able to interpret and perform printing, for example, image data, such as TIFF, and a document format of an application.

The user launches the printer driver from an application that operates on the PC 102. The user performs print setting from a printer driver screen (not shown), then selects the multifunction peripheral 103, and provides a print instruction. Here, the user is able to explicitly provide an instruction for reserve printing.

When the printer driver receives a print instruction, the printer driver displays an authentication screen (not shown). The user inputs authentication information and then provides a print instruction. The printer driver sends an authentication request to the multifunction peripheral 103 together with a user name and a password. The authentication application 321 of the multifunction peripheral 103 performs authentication by communicating with the authentication application 410 on the cloud by checking the received user name and password and sends the authentication result to the PC 102. The printer driver receives the authentication result and ends the printing process because of an error when authentication fails.

When authentication is successful, the printer driver converts application data to PDL and generates a print job. Furthermore, the printer driver incorporates user information and designated print setting into the print job. The printer driver sends the generated print job to the multifunction peripheral 103.

When the PC 102 and the multifunction peripheral 103 are present in the same authentication domain and the authentication result of the PC 102 is guaranteed, no authentication request may be issued to the multifunction peripheral 103 and the user information of the PC 102 may be used. Alternatively, an authentication process from the printer driver may be omitted, and user information registered in advance in the printer driver may be used.

[Example Procedure to Display Print Queue]

Figure 9A:
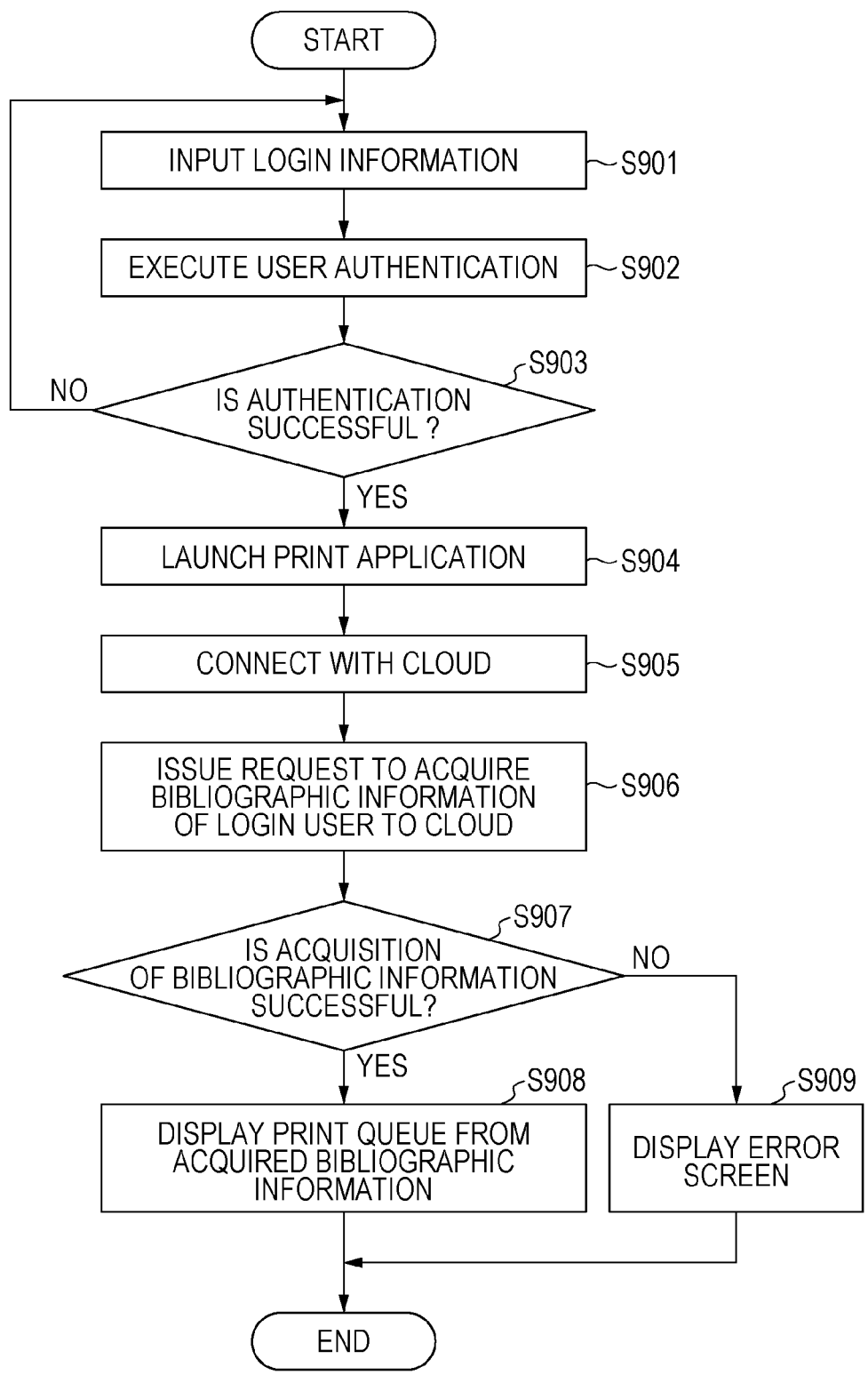
FIG. 9A is a flowchart that shows an example of a procedure in which an output machine displays a print queue.

FIG. 9A is a flowchart that shows an example of a procedure to display a list of print queue in the multifunction peripheral 105 that is an output machine according to the embodiment, which is executed on the CPU 201 of the multifunction peripheral 105. S901 to S909 are steps.

Initially, in S901, the authentication application 321 displays an authentication screen (not shown) and waits for input of authentication information from a user. The operating unit 206 having received input of authentication information from the user sends the authentication information to the authentication application 321 via the operating unit I/F 205.

The authentication application 321 performs user authentication in S902. The authentication application 321 determines in S903 whether user authentication is successful. When the authentication application 321 determines that authentication is successful, the authentication application 321 provides the authentication result to each of the applications 309, and the process proceeds to S904. When the authentication application 321 determines in S903 that authentication fails, the process returns to S901.

In S904, the print application 324 is launched when the user depresses the print icon 501 of the print application 324 as a trigger. In S905, the launched print application 324 connects with the cloud server 104 via the network communication 313.

In S906, the print application 324 issues a bibliographic information acquisition request to the cloud server 104. The acquisition request contains the name of the user authenticated in S902.

In S907, the print application 324 determines whether acquisition of bibliographic information from the cloud server 104 is successful. When acquisition is successful, the process proceeds to S908, and the print application 324 displays the print queue display screen 510 on the operating unit 206 based on the acquired bibliographic information. When acquisition of bibliographic information fails, the process proceeds to S909, and the print application 324 displays an error screen on the operating unit 206.

[Example Printing Procedure]

FIG. 9B is a flowchart that shows an example of a printing procedure that is activated when a user depresses the print button 518 or the print button 559 for a selected print job at the multifunction peripheral 105 that is an output machine according to the present embodiment, which is executed on the CPU 201 of the multifunction peripheral 105. S921 to S933 are steps of the example printing procedure.

Initially, in S921, the print application 324 displays the print queue display screen 510 by controlling the operating unit 206 of the multifunction peripheral 105. In S922, the print application 324 receives, from the application platform 307, a job list showing print jobs selected as targets to be printed by the user, from among the print jobs on the print queue display screen 510.

In S923, the print application 324 reads, from the ROM 203, the bibliographic information of the top print job from the received job list to be printed. In S924, the print application 324 extracts the storage location (IP address and directory path) of the print job from the bibliographic information.

In S925, the print application 324 extracts the job ID from the bibliographic information and sets the job ID as one type of print request parameters of the print job. A job ID is information for identifying print data. In S926, the print application 324 extracts the print setting from the bibliographic information and sets the print setting as one type of the print request parameters of the print job.

In S927, the print application 324 sets the IP address of the active multifunction peripheral 105 as a destination to which the print job is sent as one type of the print request parameters of the print job. In S928, the print application 324 issues a request to send a print job together with the print request parameters created in S925, S926, and S927 to the IP address indicating the storage location of the print job, acquired in S924.

In S929, the print application 324 determines whether a request to send the print job to the IP address of the storage location of the print job, that is, the IP address of the multifunction peripheral 103 that is an input machine, is successful. When sending of the request fails, for example the print job is not sent successfully, the process proceeds to S930, and the print application 324 displays a print error on the operating unit 206. When sending of the request is successful, for example the print job is sent successfully, the process proceeds to S931.

In S931, the print application 324 checks whether all the print jobs selected to be printed are executed. When there is any unexecuted print job, the bibliographic information of the next print job is read in S932, and the process in S924 and the following steps is repeated.

In S931, when there is no unexecuted print job, the process proceeds to S933, and the print application 324 displays a list of the print queue on the operating unit 206 again. Thus, a series of the printing process ends.

When the multifunction peripheral 105 that is an output machine and the multifunction peripheral 103 that is an input machine are one and the same device as well, the IP address of the storage location and the IP address of a destination to which a request to send a print job is sent are the same, and the process itself can be operated without any change.

[Example Deleting Procedure]

FIG. 9C is a flowchart that shows an example of a deleting procedure that is activated when a user depresses the delete button 519 for a selected print job at the multifunction peripheral 105 that is an output machine according to the present embodiment, which is executed on the CPU 201 of the multifunction peripheral 105. S941 to S951 are steps of the example deleting procedure.

Initially, in S941, the print application 324 displays the print queue display screen 510 by controlling the operating unit 206 of the multifunction peripheral 105. In S942, the print application 324 receives, from the application platform 307, a job list showing print jobs selected as targets to be deleted by the user, from among the print jobs on the displayed print queue display screen 510.

In S943, the print application 324 reads, from the ROM 203, the bibliographic information of the top print job from the received job list selected to be deleted. In S944, the print application 324 extracts the storage location (IP address and directory path) of the print job to be deleted from the bibliographic information.

In S945, the print application 324 determines whether the print job to be deleted is in the HDD 204 of the host device or in another device based on the extracted storage location (IP address, and the like) of the print job. When the print job is in another device, the process proceeds to S953. When the print job is in the HDD 204 of the host device, the process proceeds to S947, and the print job in the HDD 204 of the host device is deleted by way of the file system 303.

In S953, the print application 324 extracts the job ID of the print job to be deleted as information for identifying the print job to be deleted from bibliographic information and sets the job ID in delete request parameters.

In S946, the print application 324 issues a request to delete the print job to the acquired storage location (IP address), that is, the IP address of the input machine 103 in which the print job is stored, by way of the network I/F 210. The print application 324 that operates on the input machine 103 receives the delete request, deletes the print job in the HDD 204 of the input machine 103, and sends back a response. In S948, the print application 324 issues a request to delete the bibliographic information of the deleted print job to the cloud server 104. The bibliography management application 413 of the cloud server 104 having received the delete request deletes the bibliographic information identified in the delete request.

In S949, the print application 324 checks whether all the print jobs selected to be deleted are deleted. When there is any undeleted print job, the bibliographic information of the print job to be deleted next is read in S950, and the process in S944 and the following steps is repeated.

In S949, when there is no undeleted print job, the process proceeds to S951, and the print application 324 displays a list of print queue on the operating unit 206 again. Thus, a series of the deleting process ends.

[Example Procedure to Update Setting]

Figure 9D:
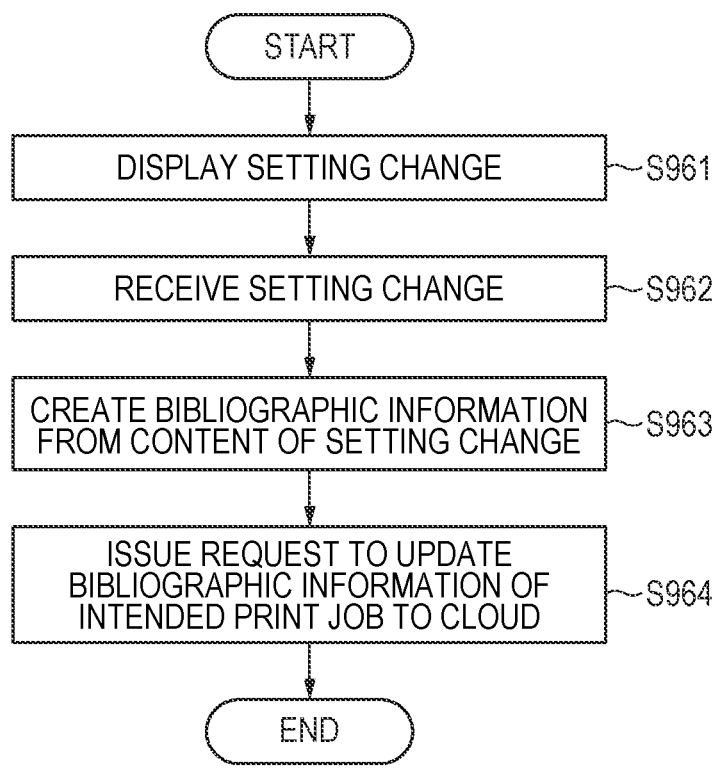
FIG. 9D is a flowchart that shows an example of a procedure in which the output machine changes a setting.

FIG. 9D is a flowchart that shows an example of a setting change procedure that is activated when a user selects the print setting button 520 for a selected print job at the multifunction peripheral 105 that is an output machine according to the embodiment, which is executed on the CPU 201 of the multifunction peripheral 105. S961 to S964 are steps for the example of a setting change procedure.

Initially, in S961, the print application 324 displays a setting change screen (FIG. 5C) on the operating unit 206 of the multifunction peripheral 105.

In S962, the print application 324 receives, from the application platform 307, a print setting set by the user with the setting change screen (FIG. 5C). Details of the print setting changed through the setting change screen of FIG. 5C are included in the request to send a print job in S928.

In S963, the print application 324 creates bibliographic information from the received print setting.

In S964, the print application 324 issues a request to update the bibliographic information by sending the created bibliographic information to the cloud server 104. The bibliography management application 413 of the cloud server 104 having received the update request updates bibliographic information to be updated. Thus, a series of the update process ends.

[Example Procedure to Respond to Request for Print Job]

Figure 10A:
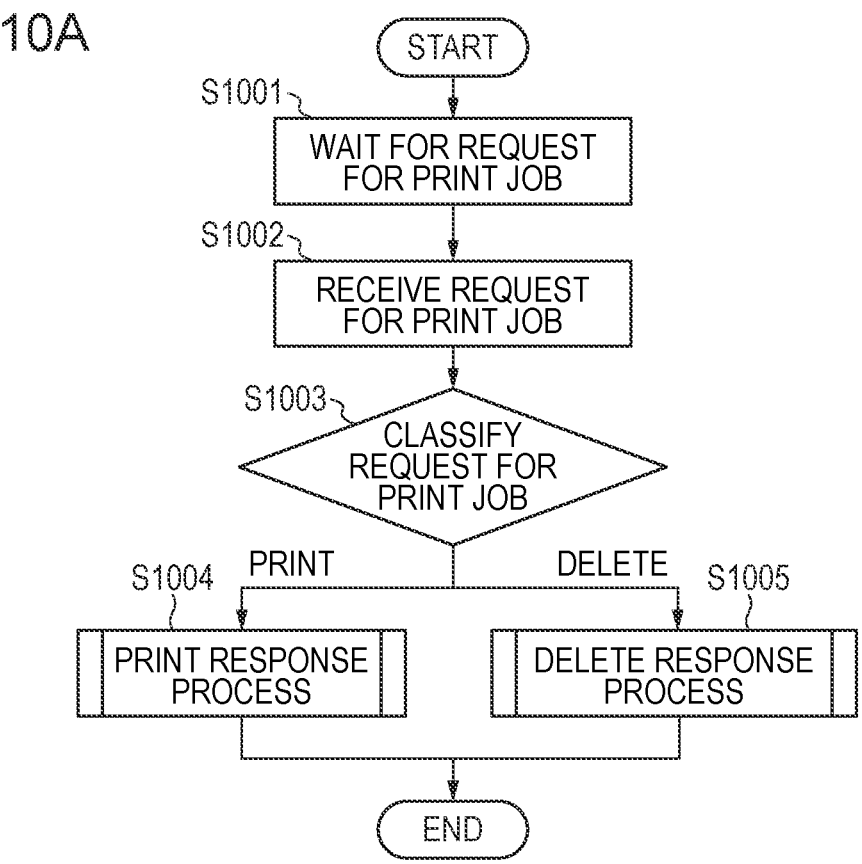
FIG. 10A to FIG. 10C are flowcharts that show examples of a procedure in which the input machine responds to a request for a print job.
Figure 10B:
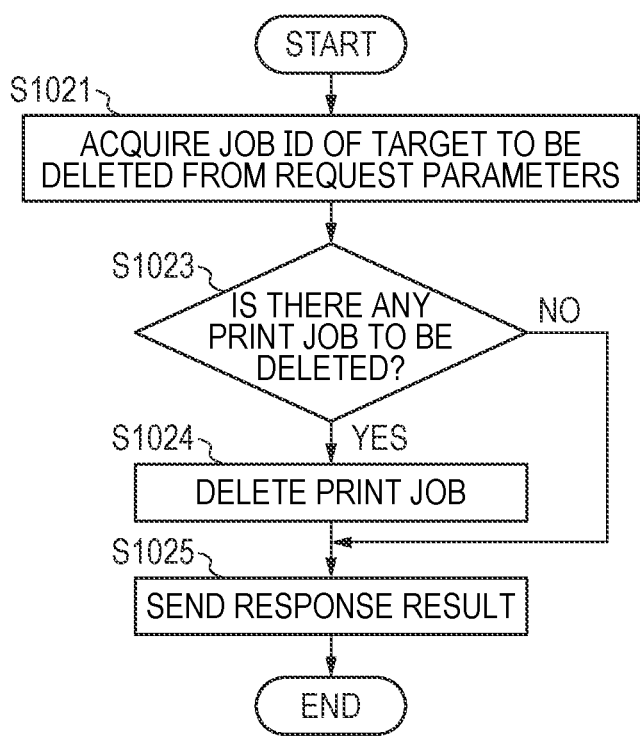
Figure 10C:
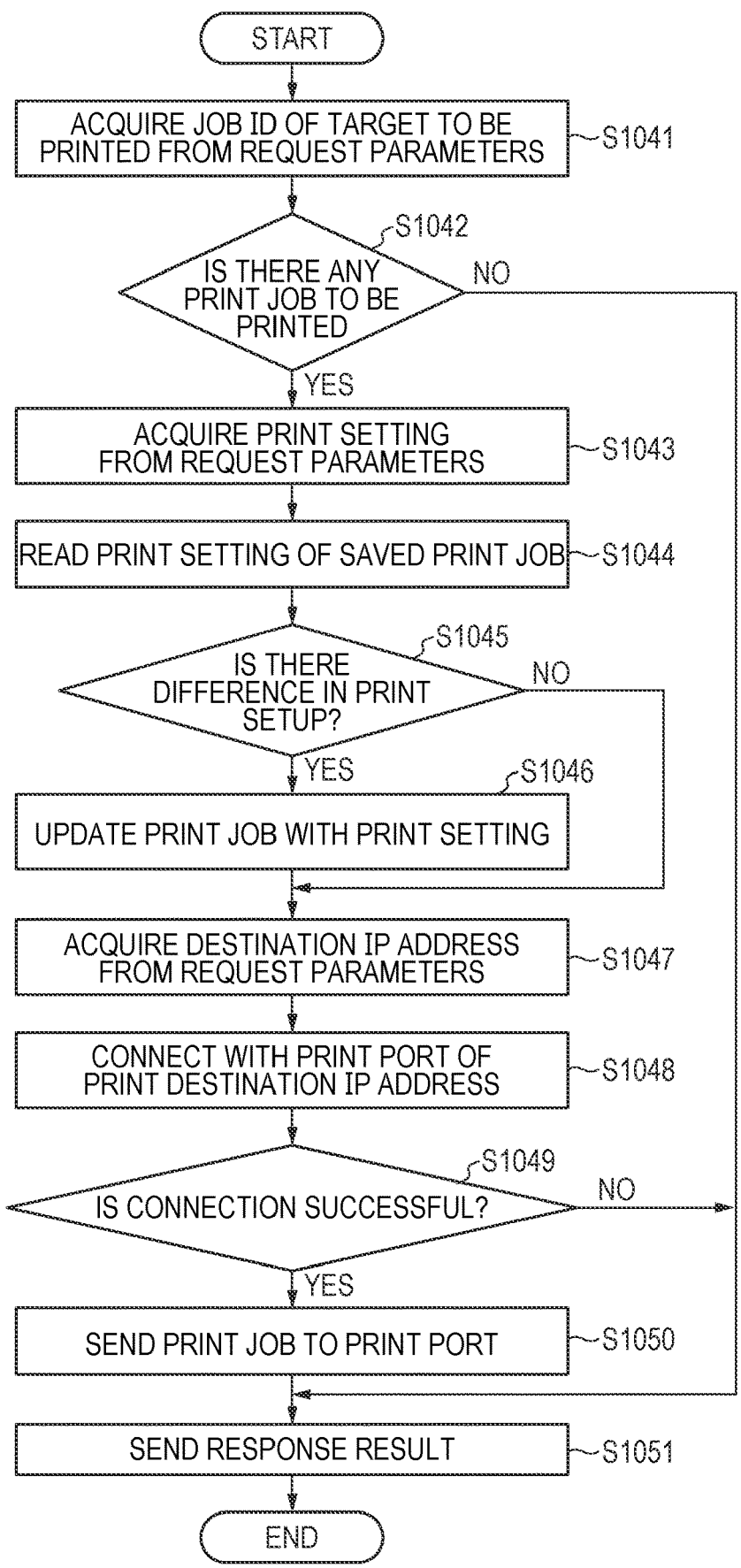

FIG. 10A to FIG. 10C are flowcharts that show examples of a procedure to respond to a request for a print job, on which a user operates to perform printing or deletion at the output machine 105, in the multifunction peripheral 103 that is an input machine according to the embodiment, which is executed by the CPU 201 of the multifunction peripheral 103. S1001 to S1051 are steps for the example procedure to respond to a request for a print job.

Initially, in FIG. 10A, in S1001, the print application 324 waits for a request for print jobs from the print application 324 that operates on the multifunction peripheral 105.

In S1002, the print application 324 receives a request for print jobs from the print application 324 that operates on the multifunction peripheral 105.

In S1003, the print application 324 classifies the received request for print jobs. When a print request is a request to send a print job (S928), the process proceeds to a print job sending response process S1004. When a print request is a request to delete a print job (S948), the process proceeds to a print job deletion response process S1005.

The details of the deletion response process of S1005 will be described with reference to the flowchart of FIG. 10B. In S1021, the print application 324 acquires the job ID from request parameters in the received request to delete a print job. The request parameter of the job ID in the deletion request is set in S928.

In S1023, the print application 324 determines whether the print job of the acquired job ID is in the HDD 204 of the multifunction peripheral 103. When there is no associated print job, it is regarded that the print job has been already deleted, and the process proceeds to S1025. When there is the associated print job, the process proceeds to S1024, and the print job in the HDD 204 of the multifunction peripheral 103 is deleted.

In S1025, the print application 324 sends a response result to the request to delete the print job to the print application 324 that operates on the multifunction peripheral 105.

The details of the print response process of S1004 will be described with reference to the flowchart of FIG. 10C. In S1041, the print application 324 acquires the job ID from the request parameters in the received request to send the print job. The request parameters of the job ID in the sending request are set in S925.

In S1042, the print application 324 determines whether the print job of the acquired job ID is in the HDD 204 of the multifunction peripheral 103. When there is no associated print job, it is regarded that a print job sending result fails, and the process proceeds to S1051. When there is the associated print job, the process proceeds to S1043.

In S1043, the print application 324 acquires print setting information from the request parameters in the received request to send the print job. The request parameters of the print setting in the sending request are set in S926. In S1044, the print application 324 reads the print setting of the print job saved in the HDD 204 of the multifunction peripheral 103.

In S1045, the print application 324 compares the read print setting of the saved print job with the print setting of the sending request parameters and checks whether there is a difference. When there is a difference, the process proceeds to S1046, the print job saved in the HDD 204 of the multifunction peripheral 103 is overwritten and updated with the print setting of the sending request parameters. The print setting to be overwritten is the job setting parameters 704 and the job finish parameters 710 in the print job 700.

The print application 324 compares device configuration information on the multifunction peripheral 103 that is an input machine with device configuration information on the multifunction peripheral 105 that is an output machine and checks whether there is a difference. Configuration information is made up of information on a finishing apparatus that performs finishing, such as stapling, punching, and folding, information on an electrophotographic engine that determines color/monochrome and supported paper size and type, and configuration information on paper trays and output trays. When there is a difference in device configuration information, the print application 324 adjusts the print job saved in the HDD 204 of the multifunction peripheral 103 that is an input machine to the device configuration information of the multifunction peripheral 105 that is an output machine and overwrites and updates the print job with the print setting. The print setting to be overwritten is the job setting parameters 704 and the job finish parameters 710 in the print job 700. For example, when the input machine 103 is a color machine and the output machine 105 is a monochrome machine, a color print setting is changed from color to monochrome and is updated.

The print application 324 deletes a print setting consumed in the multifunction peripheral 103 that is an input machine and overwrites and updates the print setting. For example, when there is a print setting of which the output type is reserve, the reserve setting is consumed when printing is not immediately performed and reserved in the multifunction peripheral 103 that is an input machine. Therefore, in a print job to be sent to the multifunction peripheral 105 that is an output machine, a print setting of which the output type is reserve is deleted. This is to avoid the inconvenience that a print job is reserved in the output machine 105 again that would arise if the print setting of which the output type is reserved was not deleted. As another example, print data having a secure print attribute may be saved in the input machine 103.

Print data having a secure print attribute needs input of a password at the time of receiving an instruction to perform printing. When user authentication has been performed, input of a password may be omitted because it becomes double authentication. Print data having a secure print attribute is reserved in a printing apparatus even when a reserve setting of the printing apparatus is disabled. Therefore, print data having a secure print attribute, which is sent from an input machine to an output machine, is reserved in the output machine again, so the input machine deletes the secure print attribute and sends the print data to the output machine as ordinary print data.

In S1047, the print application 324 acquires a print job destination IP address of the sending request parameters. The print job destination IP address of the sending request parameters is set in S927.

In S1048, the print application 324 connects with a print network port at the acquired print job destination IP address of the multifunction peripheral 105 that is an output machine.

In S1049, the print application 324 determines whether the print application 324 has established connection with the print port. When connection fails, the process proceeds to S1051, and the print application 324 sends a failed response result to the print application 324 of the source multifunction peripheral 105. When connection is successful, the process proceeds to S1050.

In S1050, the print application 324 sends the print job to the print port of the source to which connection is successful and from which a request to send a print job has been issued. The print application 324 sends a print request containing print data to the output machine.

In the network 101 that supports TCP/IP, data is transmitted between a port and a port. A print port is a port that is used to transmit data for the purpose of printing, and a RAW port (port number 9100) or an LPR port (port number 515) is often used. When the network communication 313 of the multifunction peripheral 105 that is an output machine receives a print job from a print port, execution of the print job is controlled by the job and device control 304 via the controller platform 302.

In S1051, the print application 324 sends a response result for the request to send the print job to the print application 324 that operates on the multifunction peripheral 105. Thus, a series of the print job request response process ends.

[Example Procedure to Output Print Data]

Figure 11:
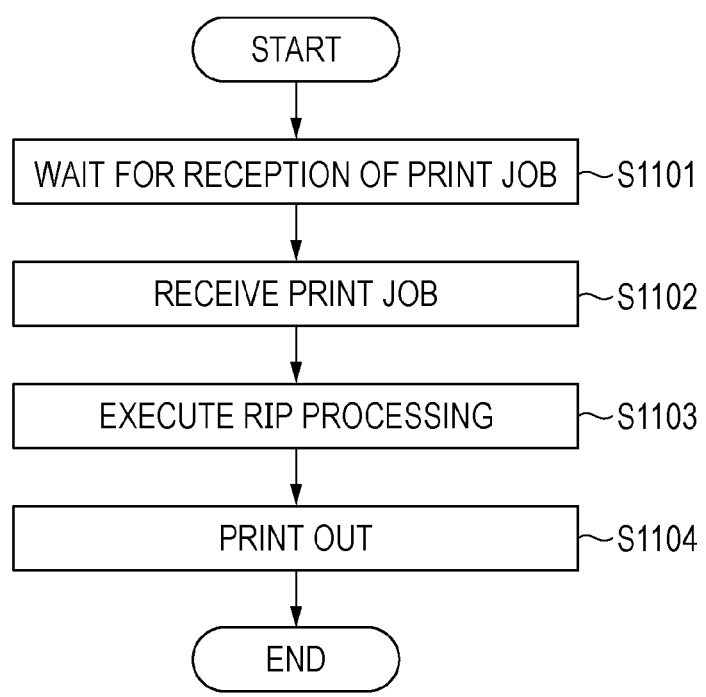
FIG. 11 is a flowchart that shows an example of a procedure in which the output machine outputs print data.

FIG. 11 is a flowchart that shows an example of a procedure in which the multifunction peripheral 105 that is an output machine according to the present embodiment outputs print data, which is executed on the CPU 201 of the multifunction peripheral 105. S1101 to S1104 are steps.

Initially, in S1101, the job and device control 304 waits for reception of a print job. When the job and device control 304 receives a print job via the network I/F 210 in S1002, the job and device control 304 provides notification to the print application 324.

In S1103, the job and device control 304 performs RIP processing on the print job in accordance with a print setting and, in S1104, provides a print instruction to the printer unit 209 via the device I/F 207 to perform printing.

The process of FIG. 11 is described on the assumption that the reserve function to save received print data in the device until a print instruction is received from a user is not enabled in the output machine 105.

Even when the reserve function is enabled, the output machine 105 may automatically execute S1103 and S1104 without the process of reserving print data when a print job is received from the multifunction peripheral 103 that is an input machine. The multifunction peripheral 103 has the function of an output machine and is able to operate as an output machine.

OTHER EXAMPLE EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-120038, filed Jun. 27, 2019 which is hereby incorporated by reference herein in its entirety.

What is claimed is:

1. A printing system comprising:
a printing apparatus; and
a storage apparatus storing print data and first print setting for the print data which are received from an external device,
the printing apparatus including:
one or more first memories storing a set of first instructions; and
one or more first processors that execute the set of first instructions to:
acquire identification information for identifying the print data stored in the storage apparatus and information indicating the first print setting for the print data;
receive, from a user, a change instruction to change the first print setting to a second print setting for the print data, wherein information regarding the change instruction is not transmitted to the storage apparatus based on receipt of the change instruction;
receive, from the user, a print instruction to print out the print data;
transmit, to the storage apparatus based on receipt of the print instruction, the identification information for identifying the print data corresponding to the print instruction and information indicating the change from the first print setting to the second print setting corresponding to the change instruction;
receive, from the storage apparatus, the print data and the second print setting for the print data by using a print port of the printing apparatus; and
print out the received print data based on the received second print setting, and
the storage apparatus including:
one or more second memories storing a set of second instructions; and
one or more second processors that execute the set of second instructions to:
receive, from the printing apparatus, the identification information for identifying the print data and the information indicating the change from the first print setting to the second print setting;
change the stored first print setting for the print data identified by the received identification information to the second print setting based on the received information indicating the change from the first print setting to the second print setting; and
transmit, to the printing apparatus, the print data identified by the received identification information and the second print setting.

2. The printing system according to claim 1, wherein the printing system further includes a management server configured to manage bibliographic information of print data.

3. The printing system according to claim 2, wherein
the one or more first processors further execute the set of first instructions to authenticate a user, and wherein
in the printing apparatus, a list of print data associated with the authenticated user is acquired from the management server.

4. The printing system according to claim 3, wherein the one or more first processors further execute the set of first instructions to:
receive selection of print data to be printed out from among the list of print data associated with the authenticated user; and
identify the storage apparatus, in which the selected print data is saved, based on the acquired bibliographic information.

5. The printing system according to claim 2, wherein the one or more second processors further execute the set of second instructions to:
receive print data from the external apparatus; and
send bibliographic information of the received print data to the management server.

6. The printing system according to claim 1, wherein, in the storage apparatus, at least one parameter in the first print setting of the saved print data is changed based on the information.

7. The printing system according to claim 1, wherein when an instruction to delete print data is received from a user at the printing apparatus, a delete request containing identification information for identifying print data associated with the delete instruction is sent to the storage apparatus, and wherein a result of deletion performed in response to the delete request is sent back to the printing apparatus.

8. A control method for a printing system including a printing apparatus and a storage apparatus storing print data and first print setting for the print data which are received from an external device, the control method comprising:

acquiring, by first printing apparatus, identification information for identifying the print data stored in the storage apparatus and information indicating the first print setting for the print data;

receiving, by the printing apparatus, a change instruction to change the first print setting to a second print setting for the print data from a user, wherein information regarding the change instruction is not transmitted to the storage apparatus based on receipt of the change instruction;

receive, from the user, a print instruction to print out the print data;

transmitting, by the printing apparatus, based on receipt of the print instruction, the identification information for identifying the print data corresponding to the print instruction and information indicating the change from the first print setting to the second print setting corresponding to the change instruction to the storage apparatus;

receiving, by the storage apparatus, the identification information for identifying the print data and the information indicating the change from the first print setting to the second print setting from the printing apparatus;

changing, by the storage apparatus, the stored first print setting for the print data identified by the received identification information to the second print setting based on the received information indicating the change from the first print setting to the second print setting;

transmitting, by the storage apparatus, the print data identified by the received identification information and the second print setting to the printing apparatus;

receiving, by the printing apparatus, the print data and the second print setting for the print data by using a print port of the printing apparatus from the storage apparatus; and printing out, by the printing apparatus, the received print data based on the received second print setting.

* * * * *